United States Patent
Kelly

(10) Patent No.: US 10,054,243 B1
(45) Date of Patent: Aug. 21, 2018

(54) DUAL SPRING FLOW CONTROL VALVE

(71) Applicant: Edmund F. Kelly, Costa Mesa, CA (US)

(72) Inventor: Edmund F. Kelly, Costa Mesa, CA (US)

( * ) Notice: Subject to any disclaimer, the term of this patent is extended or adjusted under 35 U.S.C. 154(b) by 0 days.

(21) Appl. No.: 14/638,916

(22) Filed: Mar. 4, 2015

(51) Int. Cl.
*F16K 31/06* (2006.01)
*F16K 1/54* (2006.01)

(52) U.S. Cl.
CPC ........... *F16K 31/0655* (2013.01); *F16K 1/54* (2013.01); *F16K 31/0675* (2013.01)

(58) Field of Classification Search
CPC ......... Y10T 137/7761; Y10T 137/7764; Y10T 137/87917; Y10T 137/87925; Y10T 137/87981; Y10T 137/88005; Y10T 137/88046; Y10T 137/88054; Y10T 137/88062; F16K 27/029; F16K 31/0675; F16K 31/0655; F16K 31/0624; F16K 31/02; F16K 31/0693; F16K 31/0696
USPC ........ 251/30.01–30, 129.07, 129.08, 129.15, 251/129.16, 129.17, 129.19, 129.2; 137/487, 487.5, 489, 614.2; 310/21, 29
See application file for complete search history.

(56) References Cited

U.S. PATENT DOCUMENTS

| | | | | |
|---|---|---|---|---|
| 3,921,670 A * | 11/1975 | Clippard, Jr. | ....... | F16K 31/0606 137/625.27 |
| 3,994,318 A * | 11/1976 | Ishigaki | ................ | F16K 31/404 137/630.14 |
| 4,295,631 A * | 10/1981 | Allen | ..................... | F16K 31/402 251/30.03 |
| 4,538,643 A * | 9/1985 | Goedecke | ........... | F15B 13/0438 137/625.64 |
| 4,635,683 A * | 1/1987 | Nielsen | ..................... | H01F 7/13 137/625.65 |
| 4,947,887 A * | 8/1990 | Fox | ........................ | F16K 31/402 137/625.61 |
| 5,687,759 A * | 11/1997 | Tan | ........................ | F16K 31/402 137/486 |
| 5,810,330 A * | 9/1998 | Eith | ........................ | B60T 8/363 137/630 |
| 6,220,569 B1 * | 4/2001 | Kelly | ........................ | F16K 31/06 251/129.08 |
| 6,712,088 B2 * | 3/2004 | Gamou | ................. | F16K 15/026 137/341 |
| 6,889,706 B2 * | 5/2005 | Fukano | ................... | G05D 7/005 137/487.5 |
| 6,957,663 B2 * | 10/2005 | Hirota | ................... | F25B 41/062 137/491 |
| 7,337,802 B2 * | 3/2008 | Kwon | ................. | F16K 31/0658 137/505.25 |

(Continued)

*Primary Examiner* — Matthew W Jellett
(74) *Attorney, Agent, or Firm* — Jeffer Mangels Butler & Mitchell LLP; Brennan C. Swain, Esq.

(57) ABSTRACT

An electropneumatic proportional flow control device improves electropneumatic control of pneumatically operated valves. Improved turn down ratios in regards to the electromagnetic response of the device to a supplied control voltage is achieved using two variable spring devices, one linear, as part of the pressure regulator valve component, and the other non-linear, as part of the proportional valve component and which are magnetically responsive to different magnetic forces. The use of both the linear and non-linear springs together results in an increased turndown-ratio, especially during initial valve control.

9 Claims, 2 Drawing Sheets

(56) References Cited

U.S. PATENT DOCUMENTS

| | | | | |
|---|---|---|---|---|
| 7,748,683 B1* | 7/2010 | Kelly | .................. | F16K 31/0655 |
| | | | | 251/129.08 |
| 8,813,776 B2* | 8/2014 | Stark | .................. | G05D 16/2013 |
| | | | | 137/487.5 |
| 2006/0219302 A1* | 10/2006 | Knop | .................. | F16K 31/0655 |
| | | | | 137/613 |
| 2012/0228533 A1* | 9/2012 | Ams | .................. | F16K 31/0658 |
| | | | | 251/129.03 |
| 2013/0025721 A1* | 1/2013 | Yun | ....................... | F16K 31/082 |
| | | | | 137/613 |
| 2013/0306894 A1* | 11/2013 | Wei | ......................... | F16K 25/00 |
| | | | | 251/129.15 |

* cited by examiner

DUAL SPRING FLOW CONTROL VALVE

FIELD OF THE INVENTION

The present invention relates generally to a device for electromagnetic control of pneumatically operated valves and, more specifically to such a valve having an armature design and method of operation such as to allow improved turndown ratios.

BACKGROUND OF THE INVENTION

Numerous types of proportional pneumatic flow control valves are presently available which accurately control flow over a wide range of flow control applications. However, a problem with current flow control valves is that they generally do not offer precision flow at lower rates. For balanced valves the valve percentage of error for the full scale of the valve may be too great; and, the low flow imprecision can be too problematic to the application. As such, to control such a system with PID controllers to eliminate such wide swings that are inherent within the system remains very difficult.

Unbalanced valves are (usually) simpler designed, smaller valves with low pressure drops across the valve. Advantages include a simpler design with fewer potential leak paths at the seat and a lower capital cost. Disadvantages include a limited sizes, since with a large unbalanced valve the forces needed to seat and hold the flow often becomes impractical. A general solution is to maintain holes through the plug in order to achieve an easier shut off as the plug does not have to overcome static forces. However, such a solution creates an additional leak path and at a cost that is generally higher.

In trim control applications, the selection of balanced or unbalanced designs is not entirely straightforward, and will ultimate be based upon the selection and design of the actuator. The actuator design is based on the thrust force which is required to open and close the valve, with the returning forced being supplied by either a spring or diaphragm. Selection of an actuator and spring range must be capable of handling that thrust force which is available in the selected size of valve.

To date the only conventional way to proportionally control the flow rate of a medium with flow control valves over wide swings in flow and pressure is to use two separate mechanical valves in sequence. Using two independent valves in parallel or in series will increase accuracy over particular segments of the full flow range. One valve is typically used for lower flow rates, and then a larger valve subsequently compensates for the higher flow rates. Both valves are independently controlled.

Consequently, there is a need for a single balanced valve mechanism that allows for an increase in the precision of low flow output during the initial flow performance of a device's full-scale flow capability while also allowing for higher volume flow for a remaining portion of the full-scale output.

SUMMARY OF THE INVENTION

It is an object of the present invention to provide an improved device and method for the electropneumatic control of pneumatically operated valves.

It is a feature of the present invention to provide a valve having an armature design and method of operation such as to allow improved turndown ratios.

Briefly described according to the present invention, a unique electropneumatic proportional flow control device and method that allows for improved valve actuation and an improved turn down ratio in regards to the electromagnetic response of the device to a supplied control voltage. This is achieved using two variable spring devices, one linear and the other non-linear, which are magnetically responsive to different magnetic forces. The linear spring improves the valve actuation; the valve actuation being precision control over the initial "lift off current", which is the current required to initiate flow through the valve, thereby overcoming the preloaded spring force which seals the inner valve to the valve seat. By using a linear spring, which is responsive to the relatively lower beginning magnetic pull of the valve coil, there is less variation in setting the initial preload force if the spring. The non-linear spring is utilized for the relatively higher magnetic pull of the valve coil for improved control over the greater magnetic force required for higher flow rates. The spring force resistances is non-linearly related to the magnetic actuation force.

The use of both the linear and non-linear springs together results in an increased turndown-ratio, especially during initial valve control.

Further advantages include a control mechanism that is small, lightweight, and insensitive to position or vibration. Such a device can be readily mounted in a process line to be controlled at its work point, with valves incorporating the present teachings being very well adapted for use as a main flow control valve for various medical products.

BRIEF DESCRIPTION OF THE DRAWINGS

Advantages and features of the present invention are better understood with reference to the following and more detailed description and claims taken in conjunction with accompanying drawings, in which like elements are identified with like symbols:

DESCRIPTION OF THE PREFERRED EMBODIMENTS

Figures 1, 2:
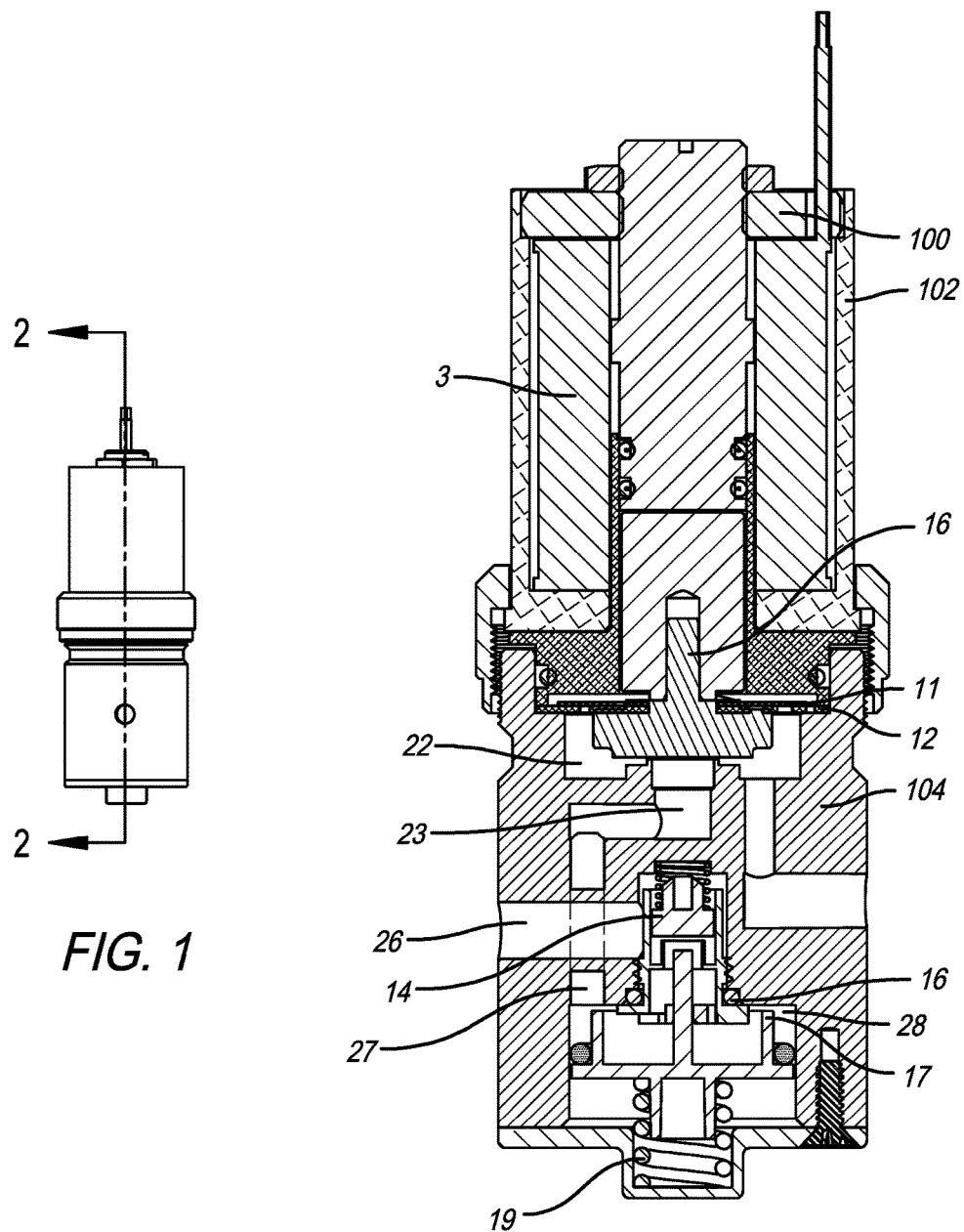
FIG. 1 is a side elevation view of a dual mode electropneumatic flow control valve according to the present invention, wherein electronic circuitry is shown in block-form.
FIG. 2 is a cross sectional view taken along line II-II if FIG. 1.

The best mode for carrying out the invention is presented in terms of its preferred embodiment, herein depicted within the Figures. Further for purposes of the present application and for convenience, certain terms employed in the specification, examples, and appended claims are collected here. Unless defined otherwise, all technical and scientific terms used herein have the same meaning as commonly understood by one of ordinary skill in the art to which this invention belongs.

The articles "a" and "an" are used herein to refer to one or to more than one (i.e., to at least one) of the grammatical object of the article. By way of example, "an element" means one element or more than one element.

The terms "comprise," "comprising," "include," "including," "have," and "having" are used in the inclusive, open sense, meaning that additional elements may be included. The terms "such as", "e.g.", as used herein are non-limiting and are for illustrative purposes only. "Including" and "including but not limited to" are used interchangeably.

The term "or" as used herein should be understood to mean "and/or", unless the context clearly indicates otherwise.

To promote an understanding of the principles of the present invention, the embodiment is hereafter explained with reference to respective drawings as well as to specific language to describe the same.

The term "actuator" should be understood broadly as being any pneumatic, hydraulic, or electrically powered device which supplies force and motion to open or close a valve.

The term "air set" as used herein should be understood to mean a regulator which is used to control the supply pressure to the valve actuator and its auxiliaries.

The term "bench set" as used herein should be understood to mean the calibration of the actuator spring range of a control valve, to account for the in service process forces.

The term "body" as used herein should be understood to mean the main pressure boundary of the valve that also provides the pipe connecting ends, the fluid flow passageway, and supports the seating surfaces and the valve closure member.

The term "bonnet" as used herein should be understood to mean the portion of the valve that contains the packing box and stem seal and may guide the stem. It may also provide the principal opening to the body cavity for assembly of internal parts or be an integral part of the valve body. It may also provide for the attachment of the actuator to the valve body. Typical bonnets are bolted, threaded, welded to, pressure-sealed, or integral with the body.

The term "cage" as used herein should be understood to mean the part of a valve trim that surrounds the closure member and may provide flow characterization and/or a seating surface. It may also provide stability, guiding, balance, and alignment, and facilitate assembly of other parts of the valve trim.

The term "capacity" as used herein should be understood to mean the rate of flow through a valve under stated conditions.

The term "cavitation" as used herein should be understood to mean two-stage phenomenon of liquid flow. The first stage is the formation of vapor bubbles within liquid system due to static pressure of fluid at vena contracta falling below the fluid vapor pressure: the second stage is the collapse or implosion of these cavities back into an all-liquid state as the fluid decelerates and static pressure is recovered.

The term "equal percentage characteristic" as used herein should be understood to mean an inherent flow characteristic which, for equal increments of rated travel, will ideally give equal percentage changes of the existing flow coefficient (Cv).

The valve characteristic term "inherent" as used herein should be understood to mean the relationship between the flow coefficient (Cv) and the closure member travel as it is moved from the closed position to rated travel with constant pressure drop across the valve.

The valve characteristic term "linear" as used herein should be understood to mean an inherent flow characteristic that can be represented by a straight line on a rectangular plot of flow coefficient (Cv) versus rated travel. Therefore, equal increments of travel provide equal increments of flow coefficient (Cv).

The valve characteristic term "quick opening" as used herein should be understood to mean an inherent flow characteristic in which a maximum flow coefficient is achieved with minimal closure member travel.

The term "cam" as used herein should be understood to mean a component in a valve positioner used to relate the closure member position to the control signal.

The term "trim" as used herein should be understood to mean a control valve trim that provides predefined flow characteristics.

The term "closure member" as used herein should be understood to mean the movable part of the valve that is positioned in the flow path to modify the rate of flow through the valve. A closure member configurations referred to as a "plug" is characterized as a closure member with contoured surface, such as the "vee plug," to provide various flow characteristics. A closure member configuration referred to as "cylindrical" is a cylindrical closure member with a flow passage through it (or a partial cylinder).

The term "eccentric" as used herein should be understood to mean a closure member face is not concentric with the stem centerline and moves into seat when closing.

The term "eccentric spherical disk" as used herein should be understood to mean a disk is spherical segment, not concentric with the disk stem.

The term "linear" as used herein should be understood to mean a closure member that moves in a line perpendicular to the seating plane.

The term "rotary" as used herein should be understood to mean a closure member which is rotated into or away from a seat to modulate flow.

The term "coefficient of flow" or the constant "Cv" as used herein should be understood to mean the related to the geometry of a valve, for a given valve travel, that can be used to predict flow rate.

The term "control valve" as used herein should be understood to mean a valve which controls the flow rate or flow direction in a fluid system. The final control element, through which a fluid passes, that adjusts the flow passage as directed by a signal from a controller to modify the flow rate.

The term "dual sealing valve" as used herein should be understood to mean a valve that uses a resilient seating material for the primary seal and a metal-to-metal seat for a secondary seal.

The term "end connection" as used herein should be understood to mean the configuration provided to make a joint with the pipe. End connections may be "flanged" in which a valve body has end connections incorporating flanges that mate with corresponding flanges on the piping. An end connection may be "split clamp" in which a valve end connections of various proprietary designs using split damps to apply gasket or mating surface loading. An end connection may be "threaded" in which the valve end connections incorporating threads, either male or female. The valve end connections may be "welded" in which valve end connections which have been prepared for welding to the line pipe or other fittings. These bay be of butt weld (BW) or socket weld (SW) types.

The term "erosion resistant trim" as used herein should be understood to mean a valve trim that has been designed with special surface materials or geometry to resist the erosive effects of the controlled fluid flow.

The term "extension bonnet" as used herein should be understood to mean a bonnet with a packing box that is extended above the bonnet joint of the valve body so as to maintain the temperature of the packing above or below the temperature of the process fluid. The length of the extension bonnet is dependent upon the difference between the fluid temperature and the packing design temperature limit as well as upon the valve body design.

The term "face to face dimension" as used herein should be understood to mean the dimension from the face of the inlet opening to the face of the outlet opening of a valve or fitting.

The term "flange facing" as used herein should be understood to mean the finish on the end connection that mates with gasket surfaces.

The term "failure mode" as used herein should be understood to mean the position to which the valve closure member moves when the actuating energy source fails. The term "fail-closed" as used herein should be understood to mean a condition wherein the valve closure member moves to a closed position when the actuating energy source fails. The term "fail-in place" as used herein should be understood to mean a condition wherein the valve closure member stays in its last position when the actuating energy source fails. The term "fail-open" as used herein should be understood to mean a condition wherein the valve closure member moves to an open position when the actuating energy source fails.

The term "fail-safe" as used herein should be understood to mean a characteristic of a particular valve and its actuator, which upon loss of actuating energy supply will cause a valve closure member to fully close; fully open or remain in fixed last position. Failsafe action may involve the use of auxiliary controls connected to the actuator.

The term "flangeless control valve" as used herein should be understood to mean a valve without integral line flanges, which is installed by bolting between companion flanges, with a set of bolts, or studs, generally extending through the companion flanges.

The term "guides" or "closure guides" as used herein should be understood to mean the means by which the closure is aligned with the seat and held stable throughout its travel. The guide is held rigidly in the body, bonnet, and/or bottom plate.

The term "hand jack" as used herein should be understood to mean a manual override device, using a lever, to stroke a valve or to limit its travel. The term "handwheel" as used herein should be understood to mean one such hand jack in which a mechanical manual override device, using a rotary wheel, is used to stroke a valve or to limit its travel.

The term "hard facing" as used herein should be understood to mean a material applied to valve internals to resist fluid erosion and/or to reduce the chance of galling between moving parts, particularly at high temperatures.

The term "hard plating: as used herein should be understood to mean a thin metal deposit, sometimes electroplated, and used to induce surface hardening. Hard plating is many orders of magnitude thinner than hard facing.

The term "hysteresis" as used herein should be understood to mean the maximum difference in output value for any single input value during a calibration cycle, excluding errors due to dead band.

The term "Integral seat" as used herein should be understood to mean a flow control orifice and seat that is an integral part of the body or cage.

The term "jacketed valve" as used herein should be understood to mean a valve body cast with a double wall or provided with a double wall by welding material around the body so as to form a passage for a heating or cooling medium. Also refers to valves which are enclosed in split metal jackets having internal heat passageways or electric heaters. The term also referred to as "steam jacketed" or "vacuum jacketed." In a vacuum jacketed valve, a vacuum is created in the space between the body and secondary outer wall to reduce the transfer of heat by convection from the atmosphere to the internal process fluid, usually cryogenic.

The term "lantern ring" as used herein should be understood to mean a rigid spacer assembled in the packing box with packing normally above and below it and designed to allow lubrication of the packing or access for a leak-off connection.

The term "lapping-in" as used herein should be understood to mean a process of mating contact surfaces by grinding and/or polishing.

The term "leakage" as used herein should be understood to mean a classification established by ANSI 816.104 to categorize seat leakage tolerances for different sizes of control valve trim. The term "seat leakage" as used herein should be understood to mean the quantity of fluid passing through a valve when the valve is in the fully closed position with pressure differential and temperature as specified.

The term "leak-off gland" as used herein should be understood to mean a packing box with packing above and below the lantern ring so as to provide a collection point for fluid leaking past the primary seal (lower packing).

The term "lined valve body" as used herein should be understood to mean a valve body in which a coating or liner has been applied to internal surfaces for corrosion/erosion protection or for flow shut off.

The term "slip-in liner" as used herein should be understood to mean an annular shaped liner which makes a slight interference fit with the body bore and which may be readily forced into position through the body end. It may be plain or reinforced and applies to butterfly valves.

The term "liquid pressure recovery factor" as used herein should be understood to mean the ratio (FL) of the valve flow coefficient (Cv) based on the pressure drop at the vena contracta, to the usual valve flow coefficient (Cv) which is based on the overall pressure drop across the valve in non-vaporizing liquid service. These coefficients compare with the orifice metering coefficients of discharge for vena contracta taps and pipe taps, respectively. See ANSI/ISA-S75.01 "Control Valve Sizing Equations."

The term "mechanical limit stop" as used herein should be understood to mean a mechanical device to limit the valve stem travel.

The term "mounting position" as used herein should be understood to mean the location and orientation of an actuator or auxiliary component relative to the control valve. This can apply to the control valve itself relative to the piping.

The term "multiple orifice" as used herein should be understood to mean a style of valve trim where the flow passes through a multiple of orifices in parallel or in series.

The term "nominal size" as used herein should be understood to mean a numerical designation of size which is common to all components in a piping system other than components designated by outside diameters or by thread size. It is a convenient round number for reference purposes and is only loosely related to manufacturing dimensions. ISO uses initials ON as an abbreviation for the term with the letters ON followed by a numerical value designating size. All equipment of the same nominal size and nominal pressure rating shall have the same mating dimensions appropriate to the type of end connections.

The term "packing" as used herein should be understood to mean a sealing system consisting of deformable material contained in a packing box which usually has an adjustable compression means to obtain or maintain an effective seal. The term "packing box" as used herein should be understood to mean the chamber, in the bonnet, surrounding the stem and containing packing and other stem sealing parts. The term "packing flange" as used herein should be understood to mean a device that transfers the deforming mechanical load to the packing follower.

The term "packing follower" as used herein should be understood to mean a part which transfers the deforming mechanical load to the packing from the packing flange or nut.

The term "packing lubricator assembly" as used herein should be understood to mean a device for injection of lubricant/sealer into a lubricator packing box.

The term "plug" as used herein should be understood to mean broadly any type of closure member. The term "plug valve" as used herein should be understood to mean a rotary motion valve with a closure member that may be cylindrical or conical.

The term "port" as used herein should be understood to mean the flow control orifice of a control valve. The term "valve port guiding" as used herein should be understood to mean a closure member with wings or a skirt fitting into the seat ring bore.

The term "positioner" as used herein should be understood to mean a position controller, which is mechanically connected to a moving part of a final control element or its actuator, and automatically adjusts its output pressure to the actuator in order to maintain a desired position that bears a predetermined relationship to the input signal. The positioner can be used to modify the action of the valve (reversing positioner), extend the stroke/controller. The term "double acting positioner" as used herein should be understood to mean a positioner with two outputs, suited to a double acting actuator. The term "single acting positioner" as used herein should be understood to mean a positioner with one output, suited to a spring opposed actuator.

The term "position switch" as used herein should be understood to mean a position switch is a pneumatic, hydraulic or electrical device which is linked to the valve stem to detect a single, preset valve stem position.

The term "position transmitter" as used herein should be understood to mean the position transmitter is a device that is mechanically connected to the valve stem or shaft and generates and transmits a pneumatic or electrical signal representing the valve position.

The term "post guiding" as used herein should be understood to mean a design using guide bushing or bushings fitted into the bonnet or body to guide the plug's post.

The term "pressure energized seal" as used herein should be understood to mean a seal energized by differential pressure.

The term "rangeabillty" as used herein should be understood to mean the inherent ratio of the largest flow coefficient (Cv) to the smallest flow coefficient (Cv) within which the deviation from the specified inherent flow characteristic does not exceed the stated limits.

The term "rated travel" as used herein should be understood to mean the amount of movement of the valve closure member from the closed position to the rated full open position.

The term "seat" as used herein should be understood to mean the area of contact between the closure component and its mating surface which establishes valve shut-off.

The term "seat ring" as used herein should be understood to mean a part of the valve body assembly that provides a seating surface for the closure member and may provide part of the flow control orifice.

The term "shaft: as used herein should be understood to mean the mechanical member used to support a rotary closure member.

The term "spring rate: as used herein should be understood to mean the force change per unit change in length of a spring.

The term "stem connector" as used herein should be understood to mean the device which connects the actuator stem to the valve stem.

The term "stem guide" as used herein should be understood to mean a guide bushing closely fitted to the valve stem and aligned with the seat.

The term "three-way valve" as used herein should be understood to mean a valve with three end connections, used for mixing or diverting flow.

The term "throttling" as used herein should be understood to mean the action of a control valve to regulate fluid flow by varying the position of the closure member. This service generates a variable pressure drop.

The term "transducer" as used herein should be understood to mean a device that is actuated by power from one system and supplies power in another form to a second system.

The term "travel" as used herein should be understood to mean the movement of the closure member from the closed position to an intermediate or rated full open position. The term "travel indicator" as used herein should be understood to mean a pointer and scale used to externally show the position of the closure member; typically in terms of units of opening percent of travel or degrees of rotation.

The term "trim" as used herein should be understood to mean the internal components of a valve which modulate the flow of the controlled fluid. The term "anti-cavitation trim" as used herein should be understood to mean a combination of control valve trim that by its geometry reduces the tendency of the controlled liquid to cavitate. The term "anti-noise trim" as used herein should be understood to mean a combination of control valve trim that by its geometry reduces the noise generated by fluid flowing through the valve. The term "balanced trim" as used herein should be understood to mean a control valve trim designed to minimize the net static and dynamic fluid flow forces acting on the trim. The term "reduced trim" as used herein should be understood to mean a control valve trim which has a flow area smaller than the full flow area for that valve. The term "soft seated trim" as used herein should be understood to mean a valve trim with an elastomeric, plastic or other readily deformable material used either in the closure component or seat ring to provide tight shutoff with minimal actuator forces.

The term "dynamic unbalance" as used herein should be understood to mean the net force/torque produced on the valve stem/shaft by fluid pressure acting on the closure member and stem/shaft at stated travel and flowing conditions. The term "static Unbalance" as used herein should be understood to mean the net force produced on the valve stem by the fluid pressure acting on the closure member and stem with the fluid at rest and with stated pressure conditions.

The term "valve" as used herein should be understood to mean a device used for the control of fluid flow, consisting of a fluid retaining assembly, one or more ports between end openings and a movable closure member which opens, restricts or closes the port(s).

The term "ball valve" as used herein should be understood to mean a valve with a rotary motion closure member consisting of a full ball or a segmented ball.

The term "diaphragm type" as used herein should be understood to mean a valve with a flexible linear motion closure member which is moved into the fluid flow passageway of the body to modify the rate of flow through the valve by the actuator.

The term "floating ball valve" as used herein should be understood to mean a valve with a full ball positioned within the valve that contacts either of two seat rings and is free to move toward the seat ring opposite the pressure source when in the closed position to effect tight shutoff.

The term "globe valve" as used herein should be understood to mean a valve with a linear motion closure member, one or more ports and a body distinguished by a globular shaped cavity around the port region.

The term "vena contracta" as used herein should be understood to mean the location in a flow stream where fluid velocity is at its maximum and fluid static pressure and the cross sectional area are at their minimum. In a control valve, the vena contracta normally occurs just downstream of the actual physical restriction.

The term "yoke" as used herein should be understood to mean the structure which rigidly connects the actuator power unit to the valve.

1. Detailed Description of the Figures

Referring now FIG. 1 and FIG. 2 a dual mode electropneumatic flow control valve is shown, generally noted as 100, according to the preferred embodiment of the present invention, in which a single integrated valve 100 incorporates a proportional valve component 102 in operational and physical coordination with a pressure regulator valve component 104. Generally, the flow path of fluid being regulated through the valve 100 can be characterized as passing initially through the regulator component 102 whereby pressure is regulated to within a manageable range for operation of a balanced type proportional valve component 102.

Referring now in conjunction with FIG. 2, the dual mode electropneumatic flow control valve 100 can be described in greater detail in which an incoming pneumatic pressure is applied at pressure inlet port 26. The incoming pressure is in fluid communication with an inner valve 14, which is mechanically attached to an internal regulator 17. As should be understood by a person having ordinary skill in the relevant art, in light of the present teachings, the internal regulator 17 may be preferably calibrated by adjusting resistance of a mechanically attached first spring 19.

Incoming pressure from the regulator 17 is subsequently allowed to pass through the inner valve 14 until a desired regulated pressure is obtained in the pressure chamber 28.

The pressure chamber 28 is in fluid communication first with a flow passageway 27, and then with a valve orifice 23. The valve orifice 23 is obstructed by a valve armature 16. The valve orifice 23, when not obstructed by valve armature 16, is in fluid communication with a chamber 22.

The chamber 22 is in fluid communication with a proportional valve orifice 23. When a proportional valve coil 3 is activated by a current, the proportional valve armature 16 is pulled away from the valve orifice 23, which creates fluid communication with chamber 22. The proportional valve actuation therefore uses said regulated pressure to vary flow rate through said valve orifice 23 and out flow passageway 24 and then outlet port 25.

2. Operation of the Preferred Embodiment

In operation, the present invention establishes a unique electropneumatic proportional flow control device and method that allows for improved valve actuation and an improved turndown ratio in regards to the electromagnetic response of the device to a supplied control voltage. This is achieved using two variable spring devices, one linear, as shown in conjunction with FIG. 4, and one nonlinear, as shown in conjunction with FIG. 3. The linear spring device 12 and nonlinear spring device 11 are each part of the pressure regulator valve component 104. Both the linear spring 12 and non-linear spring 11 are each magnetically responsive to different magnetic forces.

Figure 3:
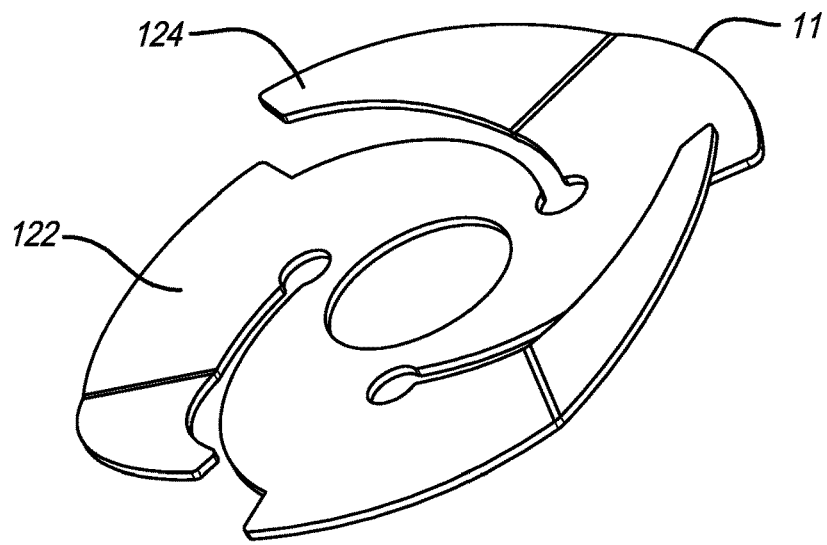
FIG. 3 is a perspective view of a nonlinear flat coil spring 12 for use in conjunction with the flow control valve according to the present invention for use in the relatively higher magnetic pull of the valve coil for improved control over the greater magnetic force required for higher flow rates.

As shown in conjunction with FIG. 3, the nonlinear spring 11 is a flat coil spring having a plurality of orbital beams 122. Each orbital beam 122 is includes a folded arm 124 that provides a moving fulcrum point upon movement of orbital spring element. Such a design provides increased mechanical strength along the last portions of spring travel as compared to the first portions of spring travel.

Figure 4:
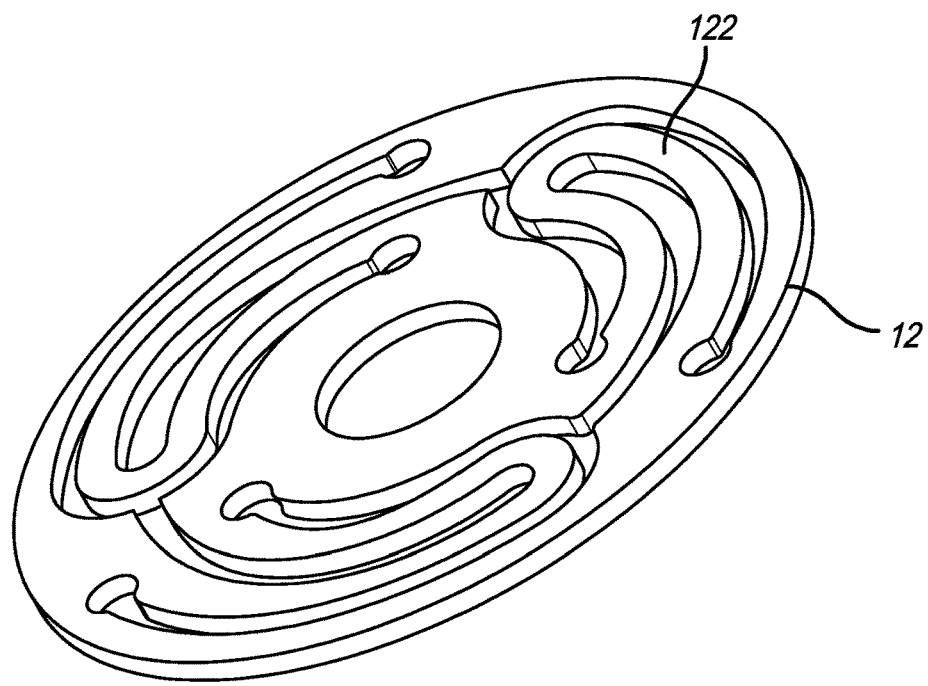
FIG. 4 is a perspective view of a linear flat coil spring 11 for use in conjunction with the flow control valve according to the present invention for use in a predictable preloaded travel at the valve opening for precision control over the initial "lift off current", which is the current required to initiate flow through the valve.

As shown further in conjunction with FIG. 4, a linear spring 12 is provided as a flat coil spring in which a preloaded spring tension is applied in order to provide a predictable preloaded travel at the valve opening. The linear spring 12 improves the valve actuation. Valve actuation is accomplished through precision control over the initial "lift off current", which is the current required to initiate flow through the valve. This overcomes the preloaded spring force which seals the inner valve to the valve seat. By using a linear spring, which is responsive to the relatively lower beginning magnetic pull of the valve coil, there is less variation in setting the initial preload force of the spring.

The non-linear spring 11 is utilized for the relatively higher magnetic pull of the valve coil for improved control over the greater magnetic force required for higher flow rates. The non-linear spring force resistant to the magnetic force is related non-linearly. The use of both the linear and non-linear springs together results in an increased turndown-ratio, especially during initial valve control.

The foregoing descriptions of specific embodiments of the present invention are presented for purposes of illustration and description only. They are not intended to be exhaustive or to limit the invention to the precise forms disclosed and, obviously, many modifications and variations are possible in light of the above teaching. The embodiments are chosen and described in order to best explain the principles of the invention and its practical application, to thereby enable others skilled in the art to best utilize the invention and the embodiments with various modifications as are suited to the particular use contemplated. It is intended that a scope of the invention be defined by the Claims appended hereto and to their equivalents. Therefore, the scope of the invention is to be limited only by the following claims.

What is claimed is:

1. An electropneumatic proportional flow control valve comprising:
a housing, a proportional valve coil disposed in the housing, a chamber defined in the housing, an armature disposed in the chamber, wherein the armature is positioned on a seat, wherein the armature includes a main body portion and a stem that extends upwardly from the main body portion, wherein the armature is configured to travel a distance from a seated position to a fully open position when the proportional valve coil provides a magnetic pull;

a linear spring device having a linear spring force and a first central opening therein; and a non-linear spring device having a non-linear spring force and a second central opening therein, wherein the stem of the armature extends through the first and second central openings, wherein the linear spring device is positioned between the main body portion of the armature and the non-linear spring, wherein between the seated position and the fully open position, the armature moves through a first travel portion and a second travel portion, wherein as the armature moves through the first travel portion the linear spring device applies the linear spring force to the armature, wherein as the armature moves through the second travel portion the non-linear spring device applies the non-linear spring force to the armature, and wherein the non-linear spring force increases as the armature moves through the second travel portion.

2. The electropneumatic proportional flow control valve of claim 1, wherein said non-linear spring device is utilized for a higher magnetic pull of the proportional valve coil at higher flow rates.

3. The electropneumatic proportional flow control valve of claim 2, wherein said linear spring and said non-linear spring operate together during a third portion of the distance.

4. The electropneumatic proportional flow control valve of claim 1 wherein the housing includes an upper housing portion and a lower housing portion, wherein the upper housing portion is separable from the lower housing portion.

5. The electropneumatic proportional flow control valve of claim 4 further comprising a proportional valve component and a pressure regulator component, wherein the proportional valve component includes the proportional valve coil and the chamber, wherein the proportional valve coil is positioned in the upper housing portion and the chamber is defined in the lower housing portion, wherein the armature is disposed in the lower housing portion, and wherein the stem extends upwardly into the upper housing portion.

6. The electropneumatic proportional flow control valve of claim 5 wherein the pressure regulator component is contained within the lower housing portion, wherein the pressure regulator component includes an inlet port and an outlet port defined in the lower housing portion, wherein the inlet port is in flow communication with a pressure chamber that includes an internal regulator therein, wherein the internal regulator is movable between a closed position and an open position by a first spring that is positioned at a distal end of the lower housing, wherein the internal regulator is in contact with an internal valve, and wherein when the first spring moves the internal regulator to the open position, the pressure chamber is fluidly communicated with a valve orifice that is associated with the seat.

7. The electropneumatic proportional flow control valve of claim 6 wherein when the proportional valve coil is energized the armature moves upwardly, thereby fluidly communicating the valve orifice with the chamber and the outlet port.

8. The electropneumatic proportional flow control valve of claim 1 wherein the magnetic pull of the proportional valve coil is stronger on the armature during the second portion of the distance than during the first portion of the distance.

9. The electropneumatic proportional flow control valve of claim 1 wherein during at least a portion of the distance the linear spring device and non-linear spring device act concurrently on the armature.

\* \* \* \* \*